UNITED STATES PATENT OFFICE.

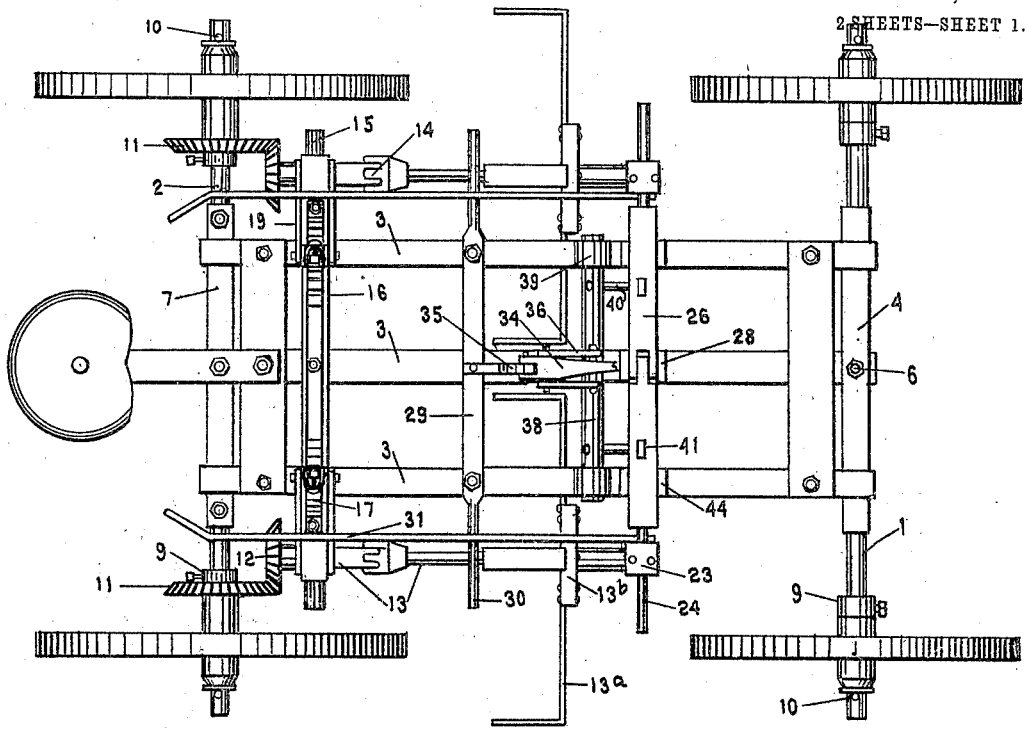

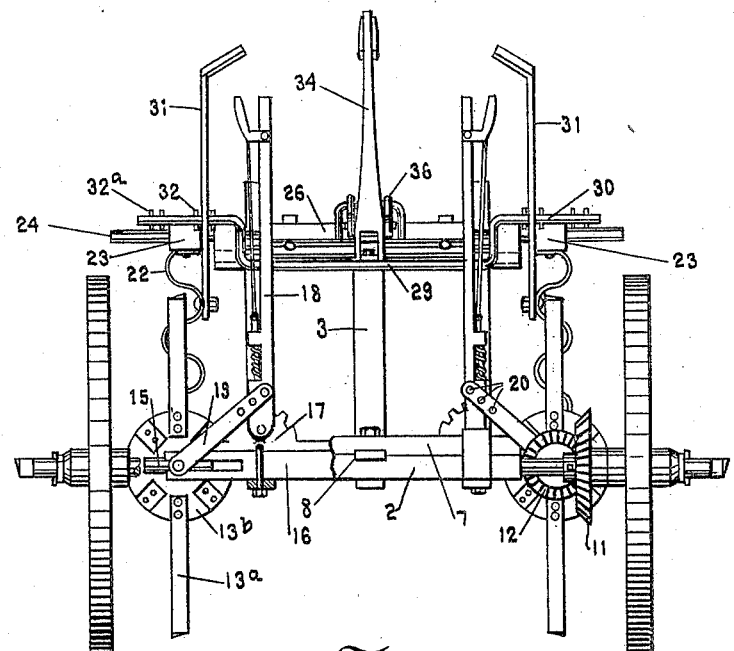
Fig. 3.
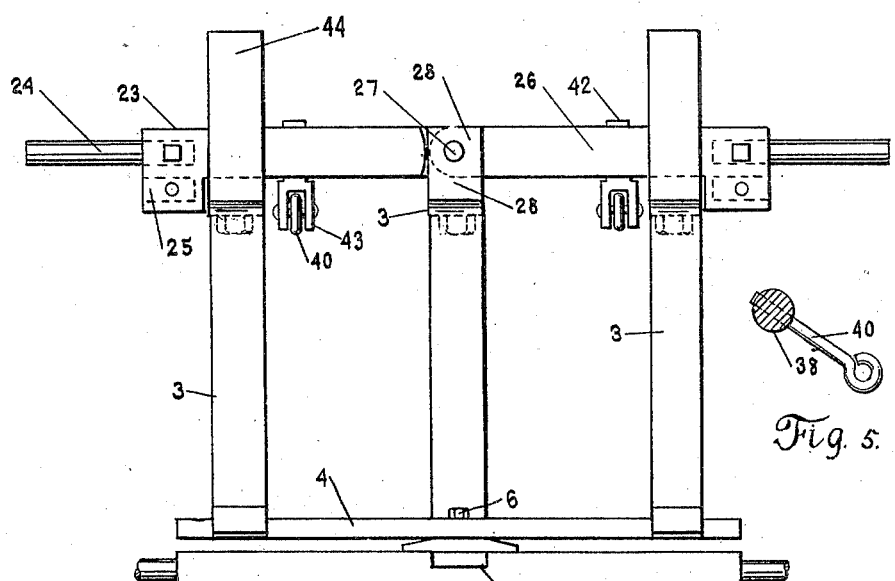
Fig. 4.
Fig. 5.

JOSEPH W. MARTIN, OF ABILENE, TEXAS.

COTTON-CHOPPER.

951,405.

Specification of Letters Patent. Patented Mar. 8, 1910.

Application filed July 19, 1909. Serial No. 508,351.

*To all whom it may concern:*

Be it known that I, JOSEPH W. MARTIN, a citizen of the United States, residing at Abilene, in the county of Taylor and State of Texas, have invented certain new and useful Improvements in Cotton-Choppers, of which the following is a specification.

My invention relates to new and useful improvements in cotton choppers, and more particularly to that class of choppers, which are adapted to operate upon two cotton rows simultaneously. Its object is primarily to provide a cotton chopper which will mechanically perform the operation of "blocking out" or chopping rows of cotton into series of equi-distant hills, at a rate of speed that will produce an economy of time and labor over the manual performance of this operation.

Another object is to provide a cotton chopper having double sets of hoes, rotating transversely of the machine, and capable of adjustment both vertically and laterally, thus allowing the depth of the stroke and the distance between the hoe shafts to be regulated.

A further object lies in the provision of a two-row cotton chopper, having resilient supports for the hoe shafts, thus permitting the hoes to be momentarily displaced from their normal path of rotation, on striking an unyielding obstacle, and so preventing breakage of hoe blades.

Finally, the object of my invention is to provide a device of the character described, that will be strong durable, simple and efficient, and comparatively easy to produce, also one in which the various parts will not be likely to get out of working order.

With these and various other objects in view, my invention has relation to certain novel features of construction and operation, an example of which is described in the following specification, and illustrated in the accompanying drawings, wherein:

Figure 1. is a top view of the cotton chopper complete with the exception that the upper portion of the lifting lever centrally mounted on the frame is broken away to show the construction therebeneath. Fig. 2. is a side elevation of the same. Fig. 3. is a rear view of the machine, a portion of the rear axle being broken away at the left side thereof, to make clear the manner of securing transverse adjustment of the rear extremity of the hoe shafts; the gearing communicating rotation to the left hoe shaft is also omitted in this view. Fig. 4. is a front view of a portion of the machine showing the construction adapting the forward extremities of the hoes to be raised and the manner of pivoting the frame on the forward axle. Fig. 5. is a detailed side view of the extremity of a rod having a curved arm attached thereto, the purposes of which are made clear hereafter.

Referring now more particularly to the drawings, wherein like numerals of reference designate similar parts in all the figures, the numeral 1, denotes the forward axle of the machine, and 2, the rear axle, the beams 3, of irregular shape, extending between the two and being supported thereby. The forward extremities of the two outer beams 3 rest upon a cross bar 4 pivoted upon the axle, the middle beam 3 being extended through a slot 5 in the axle and retained by the pivot bolt 6. The rear extremities of the two outer beams 3 rest upon the bar 7, which is bolted to the axle 2, and the middle beam is extended into a slot 8 between the bar 7 and the axle and there secured.

The transporting wheels are transversely adjustable upon both axles, set collars 9 being mounted thereupon at the inside of each wheel, and a plurality of holes 10 being provided in the extremities of the axle, adapted to receive pins, preventing outward displacement of the wheels.

Each of the rear wheels has rigidly attached to its inner side, a beveled gear 11, meshing with a beveled pinion 12, fast upon the rear extremity of a hoe shaft 13. These shafts are rendered flexible by the universal joints 14 therein. The rear extremities of the shafts 13 pass through transverse apertures in the circular rods 15, and are rotatable therein. The rods 15 are slidably mounted in the extremities of a cross bar 16, which is transversely supported upon the beams 3.

Curved, segmental racks 17 are mounted upon the cross bar 16 at each side thereof, and levers 18 are pivoted from the centers of the racks, being adapted to swing transversely of the machine, and having the usual spring-pressed rods acting in conjunction with the racks to hold the levers in adjustment. A pair of rigid, swinging links 19 extend from each lever 18 to the adjacent hoe shaft and are attached thereto at either side of the cross bar 16. Obviously, by manipulating the levers 18, the pinion 12, upon the rear extremities of the hoe shafts, may be thrown into or out of mesh with the gears 11 thus making it possible to discontinue the operation of the hoes without bringing the vehicle to a stop. It will be observed that a plurality of holes 20 are provided to the links 19 at their upper extremities, the object of these holes being to allow the operating length of the links to be increased or decreased, according to the adjusted position of the rear wheels with their attached gears 11.

The forward extremities of the hoe shafts are rotatably supported in bearings 21, attached to the lower extremities of curved springs 22. The upper extremities of these springs are supported from sliding blocks 23, mounted upon transverse rods 24. These rods extend into suitable apertures 25, in the enlarged outer extremities of bars 26, the inner extremities of the bars being pivoted upon a horizontal pin 27. Two of the apertures 25 are provided to each bar, allowing vertical adjustment of the normal operating positions of the hoe shafts, by placing the rods 24 in either of these apertures. The pivotal pin 27 is mounted in a U shaped standard 28 attached to the middle beam 3. The hoe shanks 13ª are radially attached to a disk 13ᵇ rigidly mounted upon the hoe shaft. The hoe blades are formed by turning the extremities of the shanks at a right angle and putting a cutting edge upon the same. While in the drawing, only two hoes are shown attached to the disk, it is to be understood that any desired number may be placed thereon.

A cross bar 29 is mounted centrally upon the beams 3 to the rear of the bars 26, and is provided with reduced arms 30 at either side, upon which arms levers 31 are pivoted. These levers serve the double purpose of raising the forward extremities of the hoe shafts, or displacing said extremities transversely of the machine. To produce the former effect the levers are operated vertically, while in the latter case, the levers are manipulated horizontally their displacement upon the arms 30, being prevented by pins 32 in said arms on either side of the lever. A second pair of the pins 32ª are shown in each arm, nearer the outer extremities of the arms 30, to indicate the operating position of the lever for wide rows, when the wheels are in their outermost position of adjustment. Slots 33 are provided in the levers to receive the arms 30, thus allowing the levers plenty of longitudinal play. These levers enable the operator of the machine to quickly adjust the hoe shafts vertically, or laterally, thus adapting the hoes to inequalities of the ground or divergencies of the cotton rows. A lever 34 is also provided on the machine swinging longitudinally therewith, whereby both sets of hoes may be simultaneously adjusted vertically, and held in adjustment. This lever is pivoted upon a segmental, curved rack 35, carried by a middle beam 3, and is provided with the usual spring-pressed rod adapted to engage this rack. A pair of swinging rigid links 36 connects lever 34 to the horizontal portion of a bent rod 37 the downturned extremities of which are embedded in the rocker shaft 38. Bearings 39, mounted upon the outer beams 3 rotatably support the rocker shaft. At each side of the rocker shaft an arm 40 extends rigidly thereinto, the outer extremities of these arms being curved as shown in Fig. 5. Vertical slots 41 are provided in each of the pivoted bars 26, and suitable arms 42 extend upwardly into these slots the lower extremities 43 of the arms being bifurcated to receive the loops in the lower extremities of the arms 40. Obviously when the lever 34 is manipulated the rocker shaft 38 is rotated, imparting an upward motion to the extremities of arms 40 and thus causing the bars 26 to swing upward about their central pivot 27. The bars are guided in this motion by U shaped attachments 44, one of which is attached to each of the outer beams 3.

Since the hoe shanks are not permanently attached to the disks 13ᵇ, they may be exchanged when desired for longer shanks or shanks carrying larger hoes.

The advantage of having the distance between the transporting wheels adjustable on each axle is readily apparent as the machine can thus be adapted to run between rows spaced at any ordinary distance apart.

I am aware that changes may be made in the form and proportion of parts, and details of construction of the device herein described and shown as the preferable embodiment of my invention, without departing from the spirit or sacrificing the advantage thereof and I therefore reserve the right to make such changes and alterations in said device as fairly come within its scope.

What I claim is:

1. In a cotton chopper, the combination with the frame thereof, and transporting wheels, supporting the same, of a rotatably mounted, flexible shaft extending longitudinally of the cotton chopper at each side thereof, mechanism communicating rotation to said shaft, means whereby the communication of such rotation may be interrupted, means whereby the forward extremities of the shafts may be separately elevated, a set of hoes mounted to rotate with each shaft, means whereby the working positions of each set of hoes may be laterally adjusted, and means whereby said working positions may be simultaneously adjusted vertically and held in adjustment, substantially as described.

2. In a cotton chopper, the combination with the frame thereof, and transporting wheels supporting the same, of rotatably mounted shafts longitudinal of the machine at each side thereof, mechanism whereby the communication of such rotation may be interrupted, a set of hoes mounted to rotate with each shaft, means whereby the working position of each set of hoes may be either raised or adjusted laterally, and means whereby said working positions may be simultaneously adjusted vertically and held in adjustment, substantially as described.

3. In a cotton chopper, the combination with the frame thereof, axles upholding the frame and transporting wheels supporting the axles, and adjustable thereupon, of a rotatably mounted, flexible shaft, extending longitudinally of the machine at each side thereof, gearing communicating rotation to said shafts from the transporting wheels, means whereby the communication of such rotation may be interrupted, a resilient support for the forward extremity of each shaft, means whereby the forward extremity of each shaft may be either elevated or adjusted laterally, means whereby the forward extremities of the shafts may be simultaneously adjusted vertically, and a set of hoes mounted to rotate with each shaft, substantially as described.

In testimony whereof I have signed my name to this specification in the presence of two subscribing witnesses.

JOSEPH W. MARTIN.

Witnesses:
JESSIE KIRK,
JOHN S. MURRAY.